(12) United States Patent
Wiederin et al.

(10) Patent No.: US 11,515,135 B1
(45) Date of Patent: Nov. 29, 2022

(54) SYSTEMS AND METHODS FOR INDIRECT DETECTION OF A MISSED SAMPLE

(71) Applicant: Elemental Scientific, Inc., Omaha, NE (US)

(72) Inventors: Daniel R. Wiederin, Omaha, NE (US); Kevin Wiederin, Omaha, NE (US)

(73) Assignee: Elemental Scientific, Inc., Omaha, NE (US)

( * ) Notice: Subject to any disclaimer, the term of this patent is extended or adjusted under 35 U.S.C. 154(b) by 404 days.

(21) Appl. No.: 16/847,376

(22) Filed: Apr. 13, 2020

Related U.S. Application Data (60) Provisional application No. 62/832,567, filed on Apr. 11, 2019.

(51) Int. Cl.
*H01J 49/04* (2006.01)
*G01N 35/00* (2006.01)
*H01J 49/10* (2006.01)

(52) U.S. Cl.
CPC .... *H01J 49/0431* (2013.01); *G01N 35/00732* (2013.01); *H01J 49/105* (2013.01)

(58) Field of Classification Search
CPC ...... H01J 49/0431; H01J 49/105; G01N 1/10; G01N 35/0073; G01N 35/1009; G01N 35/08
See application file for complete search history.

(56) References Cited

U.S. PATENT DOCUMENTS

| | | | |
|---|---|---|---|
| 2016/0305917 A1* | 10/2016 | Diaz | G01N 30/06 |
| 2017/0122914 A1* | 5/2017 | Warner | G01N 29/14 |
| 2018/0180639 A1* | 6/2018 | Diaz | G01N 35/1095 |

* cited by examiner

*Primary Examiner* — David E Smith
(74) *Attorney, Agent, or Firm* — Kevin E. West; Advent, LLP (57) ABSTRACT

Systems and methods are described for indirect detection of a missed sample from an autosampler. A method embodiment includes, but is not limited to, drawing a fluid through operation of an autosampler; directing the fluid via a fluid line to a valve of a fluid handling system, the valve including or being adjacent to a sensor to detect a presence or absence of liquid sample; directing the fluid from the valve into a holding line coupled to the valve; determining whether a threshold amount of liquid sample is present in the fluid in the holding line; and when it is determined that liquid sample is present in the fluid in the holding line in an amount less than the threshold amount, transferring a carrier fluid having a marker component to an analytic detector, the marker component present in the carrier fluid in an amount indicative of a missed sample.

17 Claims, 4 Drawing Sheets

SYSTEMS AND METHODS FOR INDIRECT DETECTION OF A MISSED SAMPLE

CROSS-REFERENCE TO RELATED APPLICATIONS

The present application claims the benefit of 35 U.S.C. § 119(e) of U.S. Provisional Application Ser. No. 62/832,567, filed Apr. 11, 2019, and titled "SYSTEMS AND METHODS FOR INDIRECT DETECTION OF A MISSED SAMPLE." U.S. Provisional Application Ser. No. 62/832,567 is herein incorporated by reference in its entirety.

BACKGROUND

Inductively Coupled Plasma (ICP) spectrometry is an analysis technique commonly used for the determination of trace element concentrations and isotope ratios in liquid samples. ICP spectrometry employs electromagnetically generated partially ionized argon plasma which reaches a temperature of approximately 7,000K. When a sample is introduced to the plasma, the high temperature causes sample atoms to become ionized or emit light. Since each chemical element produces a characteristic mass or emission spectrum, measuring the spectra of the emitted mass or light allows the determination of the elemental composition of the original sample.

Sample introduction systems may be employed to introduce the liquid samples into the ICP spectrometry instrumentation (e.g., an Inductively Coupled Plasma Mass Spectrometer (ICP/ICP-MS), an Inductively Coupled Plasma Atomic Emission Spectrometer (ICP-AES), or the like) for analysis. For example, a sample introduction system may withdraw an aliquot of a liquid sample from a container and thereafter transport the aliquot to a nebulizer that converts the aliquot into a polydisperse aerosol suitable for ionization in plasma by the ICP spectrometry instrumentation. The aerosol is then sorted in a spray chamber to remove the larger aerosol particles. Upon leaving the spray chamber, the aerosol is introduced into the plasma by a plasma torch assembly of the ICP-MS or ICP-AES instruments for analysis.

DRAWINGS

The Detailed Description is described with reference to the accompanying figures. The use of the same reference numbers in different instances in the description and the figures may indicate similar or identical items.

DETAILED DESCRIPTION

Overview

Automated analytical measurements for detecting the presence of an analyte in a liquid-containing sample typically involve generating a measurement sequence of calibration, quality control, and one or more sample analyses. A detector, such as an ICPMS, ICP-AES, ICP optical emission spectrometer (ICP-OES), or other sensor, is used to detect the presence of an analyte in the liquid sample, such as through determination of an intensity of signal detected, which in turn is related to the concentration of the analyte in the liquid sample. In laboratory and industrial settings, multiple samples are processed through operation of an autosampler device, which withdraws fluid samples from sample vessels and introduces the samples to sample preparation systems for preparation for processing by the detector. In practical analytical runs, a number of potential errors or other sampling conflicts might prevent a suitable amount of the fluid sample from being available to a probe of the autosampler, resulting in a "missed sample." For example, the sample might not be present or available to the probe due to a variety of reasons, including, but not limited to, a missing sample vessel at the prescribed autosampler location, an empty sample vessel, a sample vessel with insufficient amount of sample present, a capped sample tube, a mechanical failure of the autosampler, an inability of the sample probe to penetrate a septum on a sample vessel lid, an erroneous loading process, a blockage or restriction in a sample probe or fluid line, etc.

If the sample system attempts to analyze a missed sample by introducing a carrier fluid to an empty or underfilled sample holding loop there is risk that concentration data may be misreported. For instance, the carrier fluid may push or mix with gas in the sample holding loop resulting in a volume of sample provided to the detector that could be substantially less than a filled sample holding loop. Oftentimes, the detector output is presumed to relate to concentrations of analytes present in a sample having a volume of a filled sample holding loop, so empty or underfilled samples lines may not be representative of an actual sample. Regardless of the reason for a missed sample, in each case the detector will detect gas or gas bubbles rather than the expected liquid sample. In an analytical sequence when the sample is missed it may be expedient to proceed with an analytical measurement, generating data, even though the sample was detected as being not present and was not injected. Reasons to proceed with the analytical measurement sequence may include, but are not limited to, ensuring subsequent samples introduced by the autosampler are processed with the same analytical timing and pre-rinsing steps as calibration or quality control samples, efficient throughput of subsequent analyses, standardized rinse and calibration protocols and timing, and the like.

Accordingly, systems and methods are disclosed for indirect detection of a missed sample from an autosampler that is configured to provide a fluid to a detector for analysis. The fluid provided to the detector is either a sample that is confirmed to be present at a valve incorporating one or more sensors to detect liquids or, when a sample is not present at the valve, a carrier fluid that includes a marker component not normally present in a sample, diluent, or internal standard. Alternatively or additionally, the marker component is a component present at a much higher or lower concentration than is expected in a given fluid being detected (e.g., sample, diluent, internal standard, etc.). In implementations, the marker component includes a rare earth element present in the carrier fluid. Presence of the carrier solution (e.g., via the marker component) at the detector is identified by the system as a failed measurement, indirectly alerting the system to a missed sample.

Example Implementations

Referring to FIGS. 1 through 5, a system 100 for indirect detection of a missed sample is described. The system 100 generally includes a sample sensing device (e.g., a valve 102 incorporating one or more sensors to detect fluids, sometimes referred to as an injector valve), an autosampler 104, a sample loop 106, and a nebulizer 108. The autosampler 104 positions a sample probe 110 within sample vessels 112 positioned on a deck of the autosampler 104. A probe support 114 moves the probe 110 between different sample vessels 112 (e.g., according to a preprogrammed pattern or sample preparation scheme stored in computer memory) to draw a plurality of samples from the sample vessels 112 over time for sample preparation by the system 100 in a serial or distributed manner. A vacuum source, pump, or other device can apply a negative pressure within the probe 110 to draw a liquid sample from a sample vessel 112 to be introduced to the valve 102 for detection of whether a liquid sample is received by the valve 102 or whether a missed sample has been handled by the system 100. As described herein, a missed sample can include, but is not limited to, lack of a sample present within a given sample vessel 112 accessed by the probe 110, inability of the probe 110 to access a given sample vessel 112 (e.g., due to the presence of a cap, an inability to pierce a septum, etc.), or an otherwise insufficient amount of sample being present in the sample loop 106. In implementations, a vacuum is applied to a vacuum line 116 coupled with the valve 102 in a load configuration (e.g., shown in FIG. 1), where the vacuum line 116 is fluidically coupled with the probe 110 via a transfer line 118 coupled between the autosampler 104 and the valve 102. For instance, the valve 102 can include a rotary valve including a plurality of ports, where the valve 102 influences fluid flow paths through the system by selectively switching which ports are coupled via flow channels in the valve 102. In the load configuration, the vacuum line 116 is fluidically coupled with the transfer line 118 via the sample loop 106.

Figure 1:
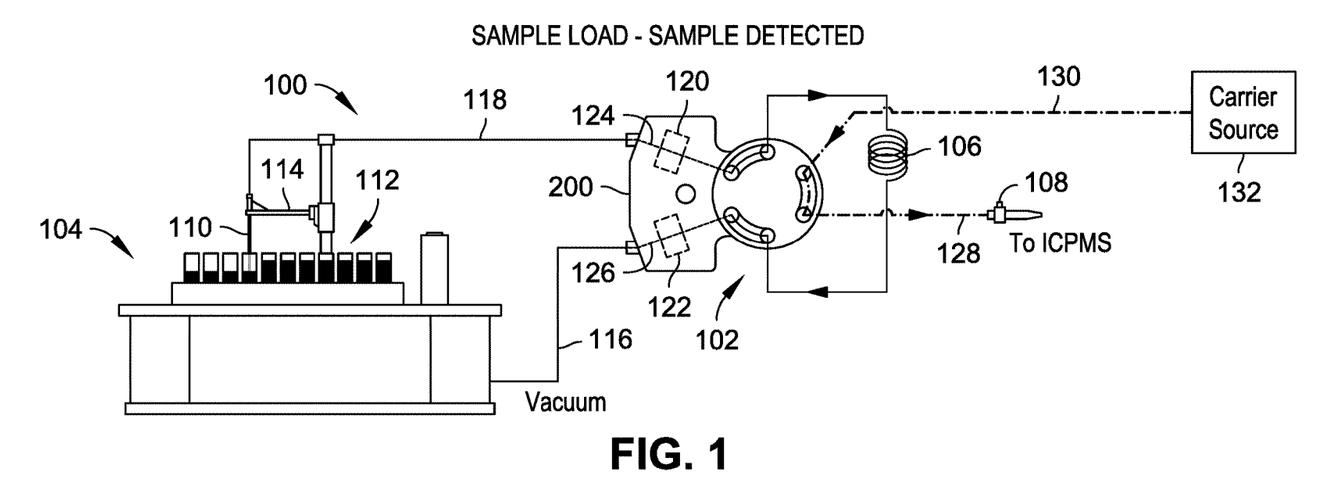
FIG. 1 is a schematic illustration of a system for indirect detection of a missed sample from an autosampler in accordance with an example embodiment of the present disclosure, wherein the system is in a sample load configuration.
Figure 4:
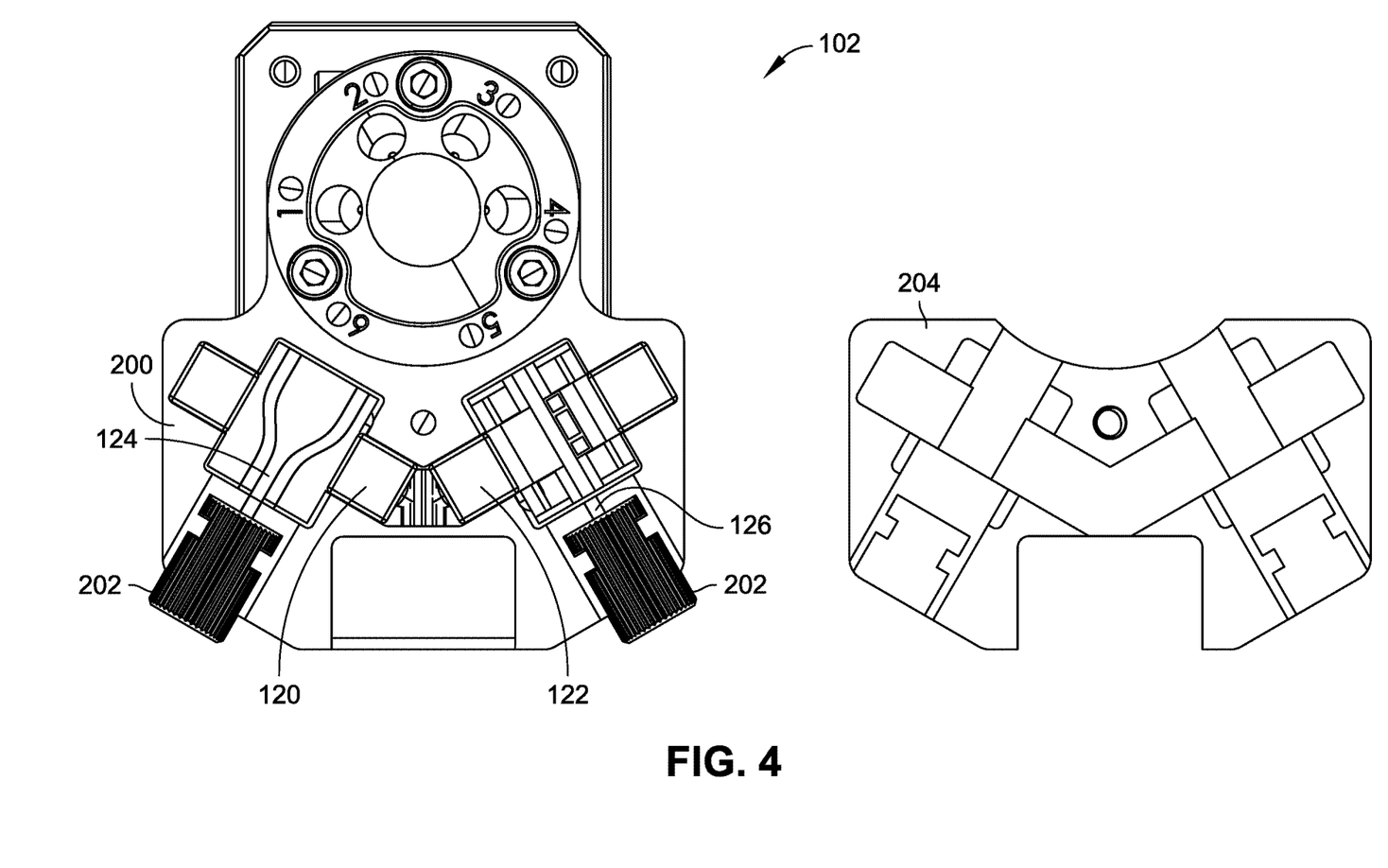
FIG. 4 is a partial diagrammatic illustration of the system valve of FIG. 1 in accordance with an example embodiment of the present disclosure, with a portion of the housing opened to show example sensors adjacent fluid lines.
Figure 5:
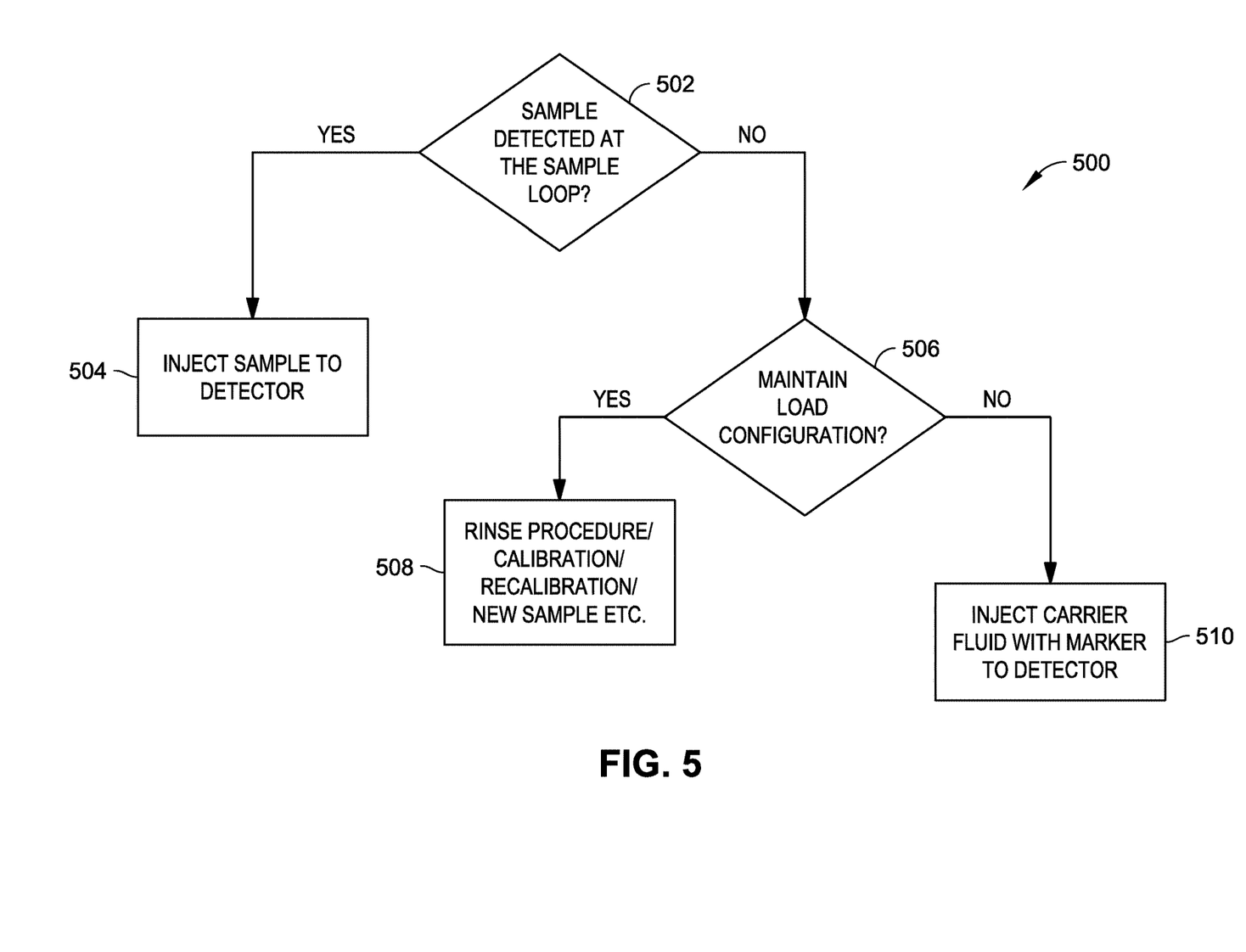
FIG. 5 is a flow chart of an example method for indirect detection of a missed sample from an autosampler in accordance with an example embodiment of the present disclosure.

During a sample load process, the valve 102 monitors for the presence or absence of a sample received from the autosampler 104 to facilitate determining whether a missed sample has occurred. The valve 102 includes one or more sensors positioned adjacent fluid lines coupled with or within the valve 102 to detect the presence of absence of fluid flowing through the fluid lines. For example, the valve 102 is shown in FIGS. 1 and 4 as including two sensors (shown as 120 and 122) positioned within a valve housing 200 to detect fluid flowing through respective fluid lines 124 and 126, or the absence thereof (e.g., detecting a gas or other void in the fluid lines). The sensors 120 and 122 can include, but are not limited to, optical sensors, acoustic sensors, ultrasonic sensors, capacitive sensors, pressure sensors, or the like, configured to distinguish the difference between the presence of liquid or gas within the respective fluid lines 124 and 126. In implementations, the housing 200 includes fittings 202 to couple the valve 102 with the transfer line 118 and the vacuum line 116 and to couple the respective lines with the fluid lines 124 and 126 within the housing 200. The housing 200 is shown in FIG. 4 including a cover 204 to cover the sensors 120 and 122 and at least a portion of the fittings 202 to secure the components within the housing 200. For instance, the cover 204 can reduce or prevent effects of external conditions on the operation of the sensors 120 and 122 (e.g., avoiding light exposure, sound exposure, temperature exposure, etc.).

In implementations, the valve 102 receives the sample from the autosampler 104 (e.g., via transfer line 118) and directs the sample through fluid line 124 and past the first sensor 120. The first sensor 120 measures the presence of the front end of the sample stream as it passes into the sample loop 106, or measures one or more gas segments or bubbles if a sample is missed at the autosampler 104 or if an erroneous loading process occurs that introduces gas into the line 118. The valve 102 directs the sample from the fluid line 124 into the sample loop 106 when in the sample load configuration. While the sample loop 106 is shown including a coiled section of tubing, the sample loop 106 is not limited to coiled configurations and can include other holding line configurations including, but not limited to, serpentine configurations, linear configurations, irregular configurations, combinations thereof, or the like. The sample is then directed from the sample loop 106 and into the fluid line 126 past the second sensor 122, where detection of the front end of the sample can indicate that sample is received in the sample loop 106. If the second sensor 122 measures one or more gas segments or bubbles, this can indicate that a sample was missed by the autosampler 104. Example implementations of the system 100 detecting the presence or absence of a sample or missed sample are provided further herein.

Figure 2:
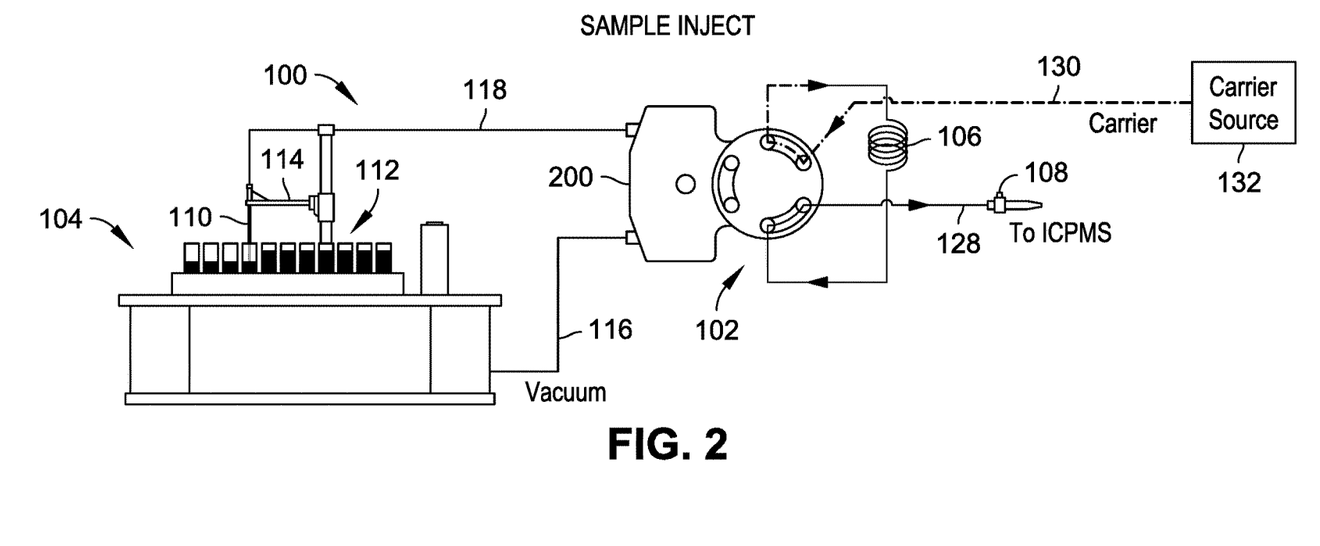
FIG. 2 is a schematic illustration of the system of FIG. 1, shown in a sample inject configuration following detection of the sample at a system valve.

When a sample is detected by the valve 102 and contained within the sample loop 106, the valve 102 can be transitioned (e.g., under system control, such as by an electric controller coordinating operation with the other components of the system 100) to an inject configuration. FIG. 2 shows an example inject configuration of the valve 102, where the valve 102 transitions the flow path configuration to decouple the sample loop 106 from the fluid lines 124 and 122 and to fluidically couple the sample loop 106 with the nebulizer 108 (e.g., via fluid line 128) to prepare the sample for injection into an ICP torch or other detector portion. For example, the valve 102 can fluidically couple the sample loop 106 with a carrier fluid (e.g., via fluid line 130) from a carrier source 132, whereby a pump can push the carrier fluid against the sample through the sample loop 106 and out toward the nebulizer 108 to carry the sample to the detector of the system 100 (e.g., an ICP analytical device, such as an ICPMS). In situations where the sample is detected by the valve 102, the carrier fluid used to introduce the sample to the detector does not include an added marker component, which is used by the system 100 to indicate a missed sample as described herein. Alternatively or additionally, the nebulizer 108 can be configured to self-aspirate fluid from the valve 102, can include a pump to draw fluid from the sample loop 106, or the like.

Figure 3:
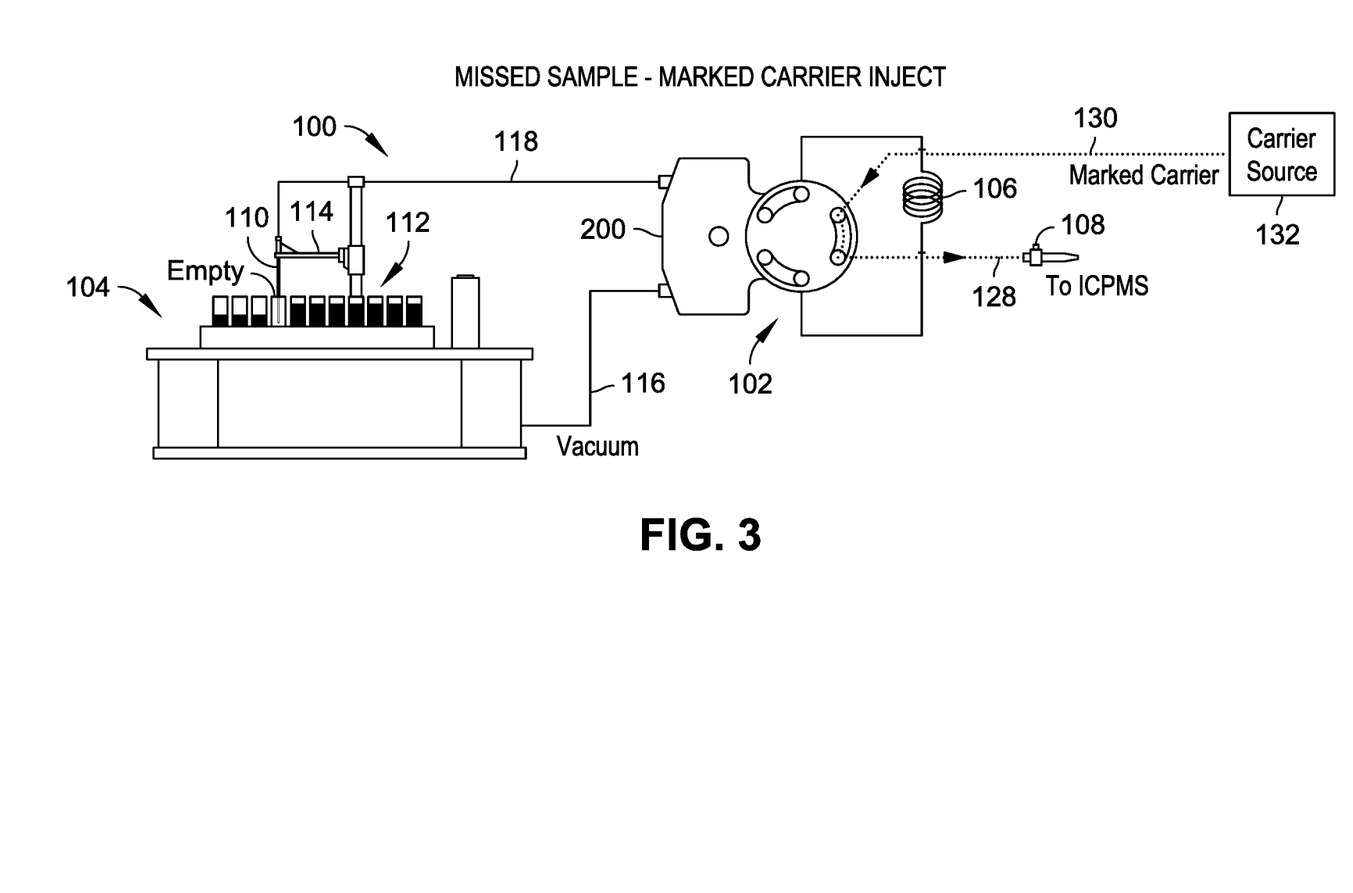
FIG. 3 is a schematic illustration of the system of FIG. 1, shown in a marked carrier inject configuration following a missed sample at the system valve.

When the valve 102 detects a missed sample, the system 100 can operate according to one or more protocols. For example, the system 100 can maintain the valve 102 in the load configuration to initiate a calibration or recalibration, attempt another sample transfer to the sample loop 106, transfer a carrier fluid having a marker component to the nebulizer 108, or the like, or combinations thereof. In implementations, the system 100 introduces a carrier fluid having a marker component to the detector of the system 100 upon detection of a missed sample from the autosampler 104 (e.g., a missed sample configuration). FIG. 3 shows an example configuration of the system 100 following detection of a missed sample. The carrier source 132 provides a carrier fluid with a marker component to the valve 102 (e.g., via fluid line 130). For example, the carrier source 132 can include a mixing port, mixing line, or other introduction structure to introduce an amount of marker component to the carrier fluid. In implementations, the marker component and the carrier fluid are mixed inline though introduction of a marker component stream and a carrier fluid stream to a mixing port of a valve, whereby other fluids can also be introduced to the carrier fluid including, but not limited to, diluents, internal standards, chemical spikes, or combinations thereof. Alternatively or additionally, the carrier source 132 can include a source of a mixture of the marker component and the carrier fluid for introduction to the valve 102 when the system 100 is in the missed sample configuration. The carrier source 132 can also include a separate reservoir containing carrier fluid without the marker component for introducing a received sample to the detector.

The marker component is a material that is not normally present in a sample, diluent or internal standard to be handled by the system 100, or is a material normally present at a much higher or lower concentration in the sample, diluent, internal standard to be handled by the system 100. For example, the marker component can be added to the carrier fluid in an amount that is at least twenty times greater than or at least twenty times less than is expected to be in a given sample. In example implementations, the marker component includes one or more rare earth elements (e.g., thulium) detectable by the analytic device. In implementations, upon detection of the marker component, the system 100 can associate the analytical results of the detector as being attributable to a missed sample. For example, when the detected amount of marker component is above a base threshold (e.g., a noise threshold for the detector), the system 100 can record the sample as being a missed sample. In implementations, the system 100 compares an output of the detector with respect to the marker component to a threshold amount of the marker component expected to be present in samples handled by the autosampler 104 to determine whether the amount detected by the detector exceeds or is below the threshold amount. In implementations, when the detected amount of marker component is above the threshold amount, the system 100 records the sample as being a missed sample. In implementations, when the detected amount of marker component is below the threshold amount, the system 100 records the sample as being a missed sample. The system 100 can generate an output indicating that a missed sample was detected. For instance, the system 100 can generate a visual output, an audible output, a tactile output, a communication to an external device (e.g., a network-based computer, smart phone, remote network-based device, etc.), or the like, or combinations thereof responsive to detection of a missed sample. The visual output can include, but is not limited to, a visual indication displayed on a display screen, an alert light adjacent the system 100, or the like or combinations thereof.

Example Detection of Samples and Missed Samples

In implementations, the first sensor 120 can be configured to determine two or more states, which can represent the presence of liquid (e.g., a liquid sample segment) at a first location in the valve 102 (e.g., in fluid line 124), the absence of liquid at the first location in the valve 102, and so forth. For example, a first state (e.g., represented by a first logic level, such as a high state) can be used to represent the presence of a liquid sample segment at the first location in the valve 102 (e.g., proximate to the first sensor 120), and a second state (e.g., represented by a second logic level, such as a low state) can be used to represent the absence of a liquid sample segment at the first location in the valve 102 (e.g., a void or gas in the fluid line 124). For example, in implementations where the first sensor 120 includes an optical sensor, the presence of liquid in the fluid line 124 can result in a reduction of light received by a light detector of the optical sensor from a light source of the optical sensor caused by reflection of a portion of the light by the liquid, whereas absence of liquid in the fluid line 124 can result in regular transmission of light between the light source and the light detector. In these examples, the first sensor 120 can report the presence of liquid sample at the first location as a high state and the absence of liquid sample at the first location as a low state. In some embodiments, the system 100 may also include one or more additional detectors, such as the second sensor 122, a third sensor, and so forth. For example, the second sensor 122 can also be configured to determine two or more states, which can represent the presence of liquid (e.g., a liquid sample segment) at a second location in the valve 102 (e.g., within the fluid line 126), the absence of liquid at the second location, and so forth. For example, a first state (e.g., represented by a first logic level, such as a high state) can be used to represent the presence of a liquid sample segment at the second location in the valve (e.g., proximate to the second sensor 122), and a second state (e.g., represented by a second logic level, such as a low state) can be used to represent the absence of a liquid sample segment at the second location.

In implementations, a system controller is communicatively coupled with the first sensor 120 and the second sensor 122 to process the output of the respective sensors to determine whether sufficient sample has been received within the sample loop 106 or whether a missed sample has occurred. The system controller and/or one or more of the sensors can include or influence the operation of a timer to provide timing of certain events (e.g., presence or absence of liquids at particular times at multiple locations in the valve 102) for the system 100. As an example, the controller can monitor the times at which changes of state are registered by the various sensor(s) in order to make determinations regarding missed samples and when to transition the system 100 to introduce marked carrier fluid to the nebulizer 108 in place of a sample from the autosampler 104. In implementations, the controller monitors the state of the first sensor 120 for a period of time and determines an amount of time the first sensor 120 maintained the state indicative of the presence of fluid. The controller can compare the amount of time spent at the state indicative of the presence of fluid to a threshold amount of time indicative of a complete sample (e.g., an insignificant of amount of time spent in the state indicative of the absence of fluid). If the fluid is not present for a time greater than the threshold time, the system 100 can indicate that insufficient sample is present in the sample loop 106, indicating a missed sample. Alternatively or additionally, the controller monitors for a set period of time and determines whether the state of the first sensor 120 changed from a state indicative of the presence of liquid to a state indicative of the absence of the liquid. If the state changed within the period of time, the controller can determine whether the time spent in the second state (e.g., indicative of the absence of the liquid) exceeds a threshold value, where the threshold valve can include a time of gas presence in the fluid line 124 that does not include a significant amount of bubbles present in the sample during transfer from the autosampler 102 to the valve 102. If the fluid is not present for a time greater than the threshold time, the system 100 can indicate that insufficient sample is present in the sample line 106, indicating a missed sample.

In implementations, the states of each of the first sensor 120 and the second sensor 122 are utilized by the system controller to differentiate between a missed sample and a sufficient sample. For example, the states of each of the first sensor 120 and the second sensor 122 are monitored to determine whether the second sensor 122 registered the state indicative of the presence of liquid prior to the first sensor 120 registering the state indicative of the absence of liquid. If the second sensor 122 registered the state indicative of the presence of liquid prior to the first sensor 120 registering the state indicative of the absence of liquid, then the controller can indicate that a threshold amount of liquid sample is present in the sample loop 106. The system 100 can then transition the valve 102 to the sample inject state to transfer the sample from the sample loop 106 to the nebulizer 108 for detection by the analytic detector. If the second sensor 122 did not register the state indicative of the presence of liquid prior to the first sensor 120 registering the state indicative of the absence of liquid, then the controller can indicate that a missed sample. The system 100 can then transition to a marked carrier inject configuration (e.g., shown in FIG. 3) to introduce the carrier fluid with the marker component to the nebulizer 108 for detection by the analytic detector to indicate a missed sample. In implementations, a threshold amount of gas is permitted in a complete sample, where a missed sample includes an amount of gas that exceeds the threshold. For example, the system controller monitors a time that the first sensor 120 registers the state indicative of the presence of fluid prior to the second sensor registering the state indicative of the absence of fluid. If the controller determines that the duration the first sensor 120 registers the first state prior to the second sensor registering the second state exceeds a threshold amount of time indicative of sufficient liquid sample, then the system 100 determines that sufficient sample is present in the sample loop 106. If the controller determines that the duration the first sensor 120 registers the first state prior to the second sensor registering the second state does not exceed a threshold amount of time indicative of sufficient liquid sample, then the system 100 determines a missed sample has occurred. Other methods of monitoring the sensors of the valve 102 can be utilized to determine whether a missed sample event has occurred and the methods described herein are example implementations and not limiting.

Example System Operating Procedure

An example operating procedure 500 is shown with respect to FIG. 5. The system 100 can begin the procedure 500 at block 502, where it is determined whether a sample is detected within the sample loop 106. If the sample is detected, then the procedure 500 follows to block 504, where the system 100 injects the sample to the detector. For example, the system 100 can transition the valve 102 to the inject configuration when it is determined that sufficient liquid sample is present in the sample loop 106 as described herein. If the sample is not detected ("No" at block 502), then the system 100 determines at block 506 whether to maintain the valve 102 in the load configuration (e.g., due to identification of a missed sample). If the valve 102 is maintained in the load configuration ("Yes" at block 506), the system 100 can initiate a calibration or recalibration, attempt another sample transfer to the sample loop 106, or the like, or combinations thereof at block 508. For example, the system 100 can instruct the valve control system to keep the valve 102 in the load configuration due to failure to sense the sample, where sample is missing from the sample loop 106 or insufficient amounts of sample are present in the sample loop 106 (e.g., too much gas present) such that concentration data from the detector would be misreported.

If the system 100 determines to not maintain the valve 102 in the loading configuration ("No" at block 506), the system 100 can introduce a carrier fluid to the nebulizer in the absence of the sample. For example, the valve 102 can received carrier fluid from the carrier source 132 via fluid line 130, where the carrier fluid includes a marker component and can also include one or more diluents, internal standards, or combinations thereof. The marker component is a material that is not normally present in a sample, diluent or internal standard to be handled by the system 100, or is a material normally present at a much higher or lower concentration in the sample, diluent, internal standard to be handled by the system 100. For example, the marker component can be added to the carrier fluid in an amount that is at least twenty times greater than or at least twenty times less than is expected to be in a given sample. For instance, the samples to be analyzed by the system 100 may have a baseline amount (e.g., trace) of the marker component material, so at least twenty times the trace amount of the marker component normally found in the samples can be added to the carrier fluid to indicate a missed sample. In example implementations, the marker component includes one or more rare earth elements (e.g., thulium). For example, if the system 100 determines to not maintain the valve 102 in the loading configuration ("No" at block 506), the system 100 can transition the valve 102 to the inject configuration and pump or otherwise introduce the carrier fluid having the marker component to the nebulizer 108 for introduction to the detector. If the analytical measurement is made without the sample present at the sample loop 106, then the carrier solution with the marker component will be measured instead of the sample. In this case, the concentration of analytes of the marker component in the carrier solution, or carrier solution mixed with diluent or internal standard solution, will be determined by the analytical detector and will indicative of a missed sample.

In an analytical sequence when the sample is missed it may be expedient to proceed with an analytical measurement (e.g., "No" at block 506) and generate data at the detector, even though the sample was detected as being not present ("No" at block 502) and was not present to be injected. Reasons to proceed with the analytical measurement sequence (e.g., "No" at block 506) may include factors such as ensuring the subsequent samples are processed with the same analytical timing and pre-rinsing steps as calibration or quality control samples, efficient throughput of subsequent analyses, standardized rinse and calibration protocols and timing, and the like. The presence of the marker component in the carrier fluid can provide an indication to the system 100 whether the measurements made by the detector are associated with a received sample or with the carrier solution having the marker component. Since the marker component is not normally present or is normally present at a much higher or lower concentration in the sample, diluent, internal standard, the system 100 can differentiate between a sample and a missed sample and can indicate that the carrier fluid is read as a failed measurement, indirectly alerting the system 100 to the missed sample.

Example Experimentation

In an example implementation, a system 100 was utilized to analyze a plurality of samples containing blood for isotopic lead content (Pb-1208) and thulium content (Tm 169), where thulium was utilized as a marker component for missed samples. Bismuth (Bi 209) was added to each fluid introduced to the analytic device as an internal standard.

Seven of the samples were placed in sample vials in sample racks available to the autosampler, where the samples vials contained the blood samples. Two other sample vials were positioned in the sample racks, but did not provide sample available to the probe of the autosampler: one sample vial was empty and one sample vial was capped with a cap that did not provide access to the sample vial interior by the autosampler probe. Samples handled by the system 100 were transferred to an ICPMS analytic device for analysis. Results of the analysis are shown in Table 1 below.

TABLE 1

| Sample ID | Acq. Time | QC Status | Pb-1 208 (cps) | Bi 209 (IS) (cps) | Tm 169 (cps) |
|---|---|---|---|---|---|
| Blood Pb | 1:53:39 PM | Passed | 17489.6 | 142851.4 | 93.3 |
| Blood Pb | 1:54:19 PM | Passed | 17524.9 | 141302.9 | 86.7 |
| Blood Pb | 1:54:39 PM | Passed | 17450.2 | 142313.4 | 126.7 |
| Blood Pb | 1:55:18 PM | Passed | 17426.2 | 142268.3 | 93.3 |
| Blood Pb | 1:55:38 PM | Passed | 17517.6 | 142268.3 | 80.0 |
| Empty Vial | 1:55:57 PM | Failed | 479.2 | 144139.6 | 321345.9 |
| Capped Sample | 1:56:17 PM | Failed | 445.8 | 143635.2 | 318745.5 |
| Blood Pb | 1:56:37 PM | Passed | 17570.3 | 142044.8 | 73.3 |
| Blood Pb | 1:56:56 PM | Passed | 17556.9 | 142044.8 | 80.0 |

The system 100 recognized the presence of the samples labeled "Blood Pb" (e.g., the sensor indicated sufficient amounts of liquid sample were transferred from the autosampler to the holding loop), where the samples were transferred to the ICPMS detector without addition of any marker component. The system 100 also recognized the absence of liquid in the samples labeled "Empty Vial" and "Capped Vial" (e.g., only gas is present in the system lines adjacent the sensor). In the absence of the liquid sample, the system 100 instead transferred carrier fluid with the marker component present to be analyzed by the ICPMS detector. For instance, analysis of the carrier fluid with the added marker component resulted in a detection of thulium of about 320000 counts per second (cps) for the missed samples (i.e., samples labeled "Empty Vial" and "Capped Vial") as compared to an average cps of thulium in detected samples (i.e., samples labeled "Blood Pb") of about 90 cps. The discrepancy between the thulium present in each liquid analyzed by the ICPMS detector is attributable to added marker component for the missed samples and no added marker component in the samples detected at the valve. For instance, the amount of thulium present in the detected samples did not exceed a threshold amount of thulium to indicate a missed sample, whereas the amount of thulium present in the missed samples exceeded the threshold amount of thulium to indicate a missed sample. The system 100 flagged the missed samples as "Failed" for the QC status as a result of exceeding the thulium threshold.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A method for indirect detection of a missed sample, comprising:

drawing a fluid from a sample vessel through operation of an autosampler;

directing the fluid via a fluid line to a valve of a fluid handling system in fluid communication with the autosampler, the valve including or being adjacent to a sensor to detect a presence or absence of liquid sample in the fluid line;

directing the fluid from the valve into a holding line coupled to the valve;

determining whether a threshold amount of liquid sample is present in the fluid in the holding line; and when it is determined that liquid sample is present in the fluid in the holding line in an amount less than the threshold amount, transferring a carrier fluid having a marker component to an analytic detector, the marker component present in the carrier fluid in an amount indicative of a missed sample.

2. The method of claim 1, wherein the marker component is present in the carrier fluid in an amount that exceeds a threshold amount expected to be present in samples handled by the autosampler.

3. The method of claim 1, wherein the marker component is present in the carrier fluid in an amount that is below a threshold amount expected to be present in samples handled by the autosampler.

4. The method of claim 1, wherein the sensor is coupled to a housing of the valve.

5. The method of claim 1, wherein determining whether a threshold amount of liquid sample is present in the fluid in the holding line includes:

monitoring a status of the sensor over a period of time;

determining an amount of time the sensor remains in a state indicative of liquid sample present in the fluid; and comparing the amount of time the sensor remains in the state indicative of liquid sample present in the fluid to a threshold amount of time indicative of a complete sample.

6. The method of claim 5, further comprising determining that a threshold amount of liquid sample is not present in the fluid in the holding line when the amount of time the sensor remains in the state indicative of liquid sample present in the fluid is less than the threshold amount of time indicative of the complete sample.

7. The method of claim 1, wherein the fluid handling system includes:

the sensor configured to detect a presence or absence of liquid sample at a first location in the fluid line, the sensor registering a first state responsive to detection of the liquid sample at the first location and registering a second state response to absence of the liquid sample at the second location; and a second sensor configured to detect a presence or absence of liquid sample at a second location downstream from the first location, the second sensor registering a first state responsive to detection of the liquid sample at the second location and registering a second state response to absence of the liquid sample at the second location.

8. The method of claim 7, wherein determining whether a threshold amount of liquid sample is present in the fluid in the holding line includes:

monitoring whether the second sensor registered the first state prior to the sensor registering the second state; and determining that a threshold amount of liquid sample is present in the fluid in the holding line when the second sensor registered the first state prior to the sensor registering the second state.

9. The method of claim 7, wherein determining whether a threshold amount of liquid sample is present in the fluid in the holding line includes:

monitoring a time that the sensor registers the first state prior to the second sensor registering the second state; and determining that a threshold amount of liquid sample is present in the fluid in the holding line when the time that the sensor registers the first state prior to the second sensor registering the second state exceeds a threshold amount of time indicative of sufficient liquid sample.

10. The method of claim 7, wherein each of the sensor and the second sensor is coupled to a housing of the valve.

11. The method of claim 1, wherein the marker component includes a rare earth element.

12. The method of claim 1, further comprising generating an output indicating a missed sample at the valve based on detection of the marker component in the carrier fluid in an amount indicative of a missed sample by the analytic detector.

13. The method of claim 12, wherein the output includes at least one of a visual signal or an audio signal.

14. The method of claim 1, wherein transferring a carrier fluid having a marker component to an analytic detector includes transferring the carrier fluid having the marker component through the valve prior to transfer of the analytic detector.

15. The method of claim 14, wherein the carrier fluid having the marker component bypasses the holding line.

16. The method of claim 1, further comprising transferring fluid in the holding line to the analytic detector when it is determined that liquid sample is present in the fluid in the holding line in an amount at or exceeding the threshold amount.

17. The method of claim 16, wherein transferring fluid in the holding line to the analytic detector introducing a carrier fluid without the marker component to the holding line to push the fluid in the holding line through the valve and to the analytic detector.

* * * * *